(12) United States Patent
Ishigame et al.

(10) Patent No.: US 9,346,340 B2
(45) Date of Patent: May 24, 2016

(54) DOOR STRUCTURE OF VEHICLE

(71) Applicant: MAZDA MOTOR CORPORATION, Hiroshima (JP)

(72) Inventors: Katsuyoshi Ishigame, Hiroshima (JP); Yuichi Sugimura, Higashihiroshima (JP); Hirotaka Takaya, Aki-gun (JP); Kyohei Yukita, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/191,189

(22) Filed: Feb. 26, 2014

(65) Prior Publication Data

US 2014/0246879 A1    Sep. 4, 2014

(30) Foreign Application Priority Data

Mar. 4, 2013   (JP) ................................ 2013-042100

(51) Int. Cl.
*B60J 5/04* (2006.01)

(52) U.S. Cl.
CPC .............. *B60J 5/0444* (2013.01); *B60J 5/0422* (2013.01); *B60J 5/0437* (2013.01); *B60J 5/0443* (2013.01); *B60J 5/042* (2013.01); *B60J 5/0429* (2013.01)

(58) Field of Classification Search
CPC .......... B60J 5/04; B60J 5/0412; B60J 5/0413; B60J 5/0415; B60J 5/042; B60J 5/0422; B60J 5/0423; B60J 5/0429; B60J 5/0437; B60J 5/0443; B60J 5/0444
USPC ......................... 296/30, 146.5, 146.6, 187.12
See application file for complete search history.

(56) References Cited

U.S. PATENT DOCUMENTS

| 5,370,437 | A | * | 12/1994 | Alberda | ..................... 296/146.6 |
| 5,743,588 | A | * | 4/1998 | Ufrecht | ..................... 296/146.6 |
| 5,992,922 | A | * | 11/1999 | Harbig et al. | .............. 296/146.6 |
| 2007/0145770 | A1 | * | 6/2007 | Katou et al. | ............... 296/146.6 |
| 2010/0148535 | A1 | * | 6/2010 | Takahashi et al. | ....... 296/187.12 |
| 2013/0033065 | A1 | * | 2/2013 | Johansson | .................. 296/146.6 |

FOREIGN PATENT DOCUMENTS

JP    2007-216831 A    8/2007

* cited by examiner

*Primary Examiner* — Jason S Daniels
(74) *Attorney, Agent, or Firm* — Studebaker & Brackett PC

(57) ABSTRACT

An impact bar includes a U-shaped portion formed by a vertical face portion and upper-and-lower lateral face portions at its front end. The impact bar further includes upper-and-lower outer face portions. A pair of first joint portions which are formed so as to extend upward and downward from respective front ends of the upper-and-lower lateral face portions are joined to a lateral face portion of a door inner panel. A pair of second joint portions which are formed so as to extend forward from respective front ends of the upper-and-lower outer face portions are joined to a longitudinal face portion of the door inner panel.

12 Claims, 8 Drawing Sheets

DOOR STRUCTURE OF VEHICLE

BACKGROUND OF THE INVENTION

The present invention relates to a door structure of a vehicle, in which an impact bar is provided in an inner space of a door body formed by a door inner panel and a door outer panel, the impact bar being configured to extend in a vehicle longitudinal direction and be joined to the door inner panel of the door body.

Conventionally, a structure shown in FIGS. 7 and 8 is known as an example of the above-described door structure of a vehicle. That is, a door body 83 is formed by a door inner panel 81 and a door outer panel 82, and the door inner panel 81 is, as shown in FIG. 7, formed integrally, through pressing, by a front side portion 81a, a lower side portion 81b, a rear side portion 81c, and a vertical wall portion 81d enclosed by the respective side portions 81a, 81b, 81c. Herein, at the vertical wall portion 81d are formed an opening portion 84 for arranging a door module and an opening portion 85 for arranging a sound speaker positioned in front of the opening portion 84. Further, an impact bar 87 is provided in an inner space 86 (see FIG. 8) of the above-described door body 83. The impact bar 87 is configured to extend in a vehicle longitudinal direction and be attached to the door inner panel 81.

The impact bar 87 is arranged such that it slants with its front being located at a higher level than its rear as shown in FIG. 7. A front end portion 87a of the impact bar 87 is formed as a flat portion 87b, which is formed in a flat shape. The flat portion 87b is joined by spot welding to a vertical face portion 81e, which extends in parallel to the vehicle longitudinal direction, of the front side portion 81a of the door inner panel 81, so that a joint face 88 is formed and the door rigidity in a vehicle head-on collision and a vehicle side collision is improved.

In the above-described conventional structure, the door rigidity in the vehicle collision (the vehicle head-on and side collisions) can be improved to a certain degree. However, since the above-described joint face 88 is arranged in parallel to an input direction of a collision load occurring in the vehicle head-on collision, the transmission performance of the vehicle-head-on collision load to the impact bar 87 may be so low that the vehicle-head-on collision load may not be received properly only at the impact bar 87 and therefore it may be necessary to provide another impact bar additionally.

Herein, Japanese Patent Laid-Open Publication No. 2007-216831 discloses a door structure of a vehicle which is substantially the same as the above-described conventional structure shown in FIGS. 7 and 8. Consequently, the door structure disclosed in the above-described patent document may have the same problem as that of the above-described conventional structure shown in FIGS. 7 and 8.

SUMMARY OF THE INVENTION

Accordingly, an object of the present invention is to provide a door structure of a vehicle which can effectively transmit the vehicle-head-on collision load rearward as well as improve the resistance against the vehicle side collision so as to cope with both the vehicle head-on collision and the vehicle side collision even with a single impact bar.

According to the present invention, there is provided a door structure of a vehicle, comprising a door body including a door inner panel and a door outer panel, and an impact bar provided in an inner space of the door body and extending in a vehicle longitudinal direction, the impact bar being joined to the door inner panel of the door body, wherein the door inner panel of the door body includes a corner portion at a front end thereof, which is formed by a lateral face portion extending substantially in a vehicle width direction and a longitudinal face portion extending substantially in the vehicle longitudinal direction, the impact bar includes a U-shaped portion at a front end thereof, the U-shaped portion being formed in substantially a U shape by a vertical face portion extending substantially in a vehicle vertical direction and upper-and-lower lateral face portions extending respectively outward in the vehicle width direction from upper and lower ends of the vertical face portion, the impact bar further including upper-and-lower outer face portions which are configured to extend upward and downward from respective outward ends of the upper-and-lower lateral face portions, and the joining of the impact bar to the door inner panel of the door body is configured such that a pair of first joint portions which are formed so as to extend upward and downward from respective front ends of the upper-and-lower lateral face portions of the impact bar are joined to the lateral face portion of the corner portion of the door inner panel, respectively, whereas a pair of second joint portions which are formed so as to extend forward from respective front ends of the upper-and-lower outer face portions of the impact bar are joined to the longitudinal face portion of the corner portion of the door inner panel, respectively.

According to the present invention, since the amount of contact with the door inner panel can be properly large by means of the first joint portions, the vehicle-head-on collision load can be received surely. Further, since the U-shaped portion contacts the lateral face portion of the door inner panel, the vehicle-head-on collision load can be transmitted rearward more effectively by the four ridgelines of the impact bar which extend rearward from the U-shaped portion. In the vehicle side collision, meanwhile, while the vehicle-side collision load received by the second joint portions is inputted to the door inner panel via the first joint portions and the U-shaped portion, the amount of contact of the front end of the impact bar with the door inner panel is so large that a large reaction force from the door inner panel to the impact bar can occur and also a moment around front portions of outward ends, in the vehicle width direction, of the U-shaped portion, with a moment arm of the length in the vehicle width direction of the U-shaped portion (a moment acting in a specified direction which can cancel a moment caused by the vehicle-side collision load) can occur properly. Accordingly, the resistant load of the impact bar can be properly large, so that the impact bar can be restrained from deforming, and thus the large vehicle-side collision load can be received properly (see FIG. 6). Moreover, the first joint portions and the second joint portions can be arranged within a vertical width of the impact bar, so that even if the impact bar is configured to have the relatively-small vertical width, the impact bar can be joined to the door inner panel properly. Accordingly, the layout flexibility of the impact bar can be improved. Consequently, the vehicle-head-on collision load can be effectively transmitted rearward, and also the resistance against the vehicle side collision can be improved. Thus, the door structure according to the present invention can cope with both the vehicle head-on collision and the vehicle side collision even with a single impact bar.

According to an embodiment of the present invention, a body portion of the impact bar comprises the U-shaped portion, the upper-and-lower outer face portions, upper and lower face portions being configured to extend respectively inward in the vehicle width direction from upper and lower ends of the upper-and-lower outer face portions, and upper-and-lower inner face portions being configured to extend upward and downward from respective inward ends of the upper and lower face portions, whereby the body portion of the impact bar has substantially a W-shaped cross section. Thereby, a central portion, in the vehicle vertical direction, of the W-shaped body portion of the impact bar can be formed by extending the four ridgelines of the U-shaped portion, and also the rigidity and strength of the impact bar itself can be improved.

According to another embodiment of the present invention, a first ridgeline formed between the upper face portion and the upper outer face portion, a second ridgeline formed between the upper face portion and the upper inner face portion, and an upper end line formed at an upper end of the upper inner face portion converge at a point near a rear end of one of the second joint portions, and a third ridgeline formed between the lower face portion and the lower outer face portion, a fourth ridgeline formed between the lower face portion and the lower inner face portion, and a lower end line formed at a lower end of the lower inner face portion converge at a point near a rear end of the other of the second joint portions. Thereby, the appropriate forming of the impact bar can be ensured.

According to another embodiment of the present invention, a first ridgeline formed between the upper face portion and the upper outer face portion and a second ridgeline formed between the upper face portion and the upper inner face portion converge at a point near a rear end of one of the second joint portions, and a third ridgeline formed between the lower face portion and the lower outer face portion and a fourth ridgeline formed between the lower face portion and the lower inner face portion converge at a point near a rear end of the other of the second joint portions. Thereby, the appropriate forming of the impact bar can be ensured. Further, a stress which may be generated in the vehicle head-on collision or the vehicle side collision can be dispersed at points of rear ends of the second joint portions as well as front portions of the upper-and-lower inner face portions which correspond to the above-described converging point.

According to another embodiment of the present invention, the first joint portions are arranged at a position which overlaps a door hinge to attach the door body to a vehicle body in the vehicle vertical direction. In the vehicle head-on collision, the vehicle-head-on collision load is inputted to a hinge pillar from an apron reinforcement and then inputted to the door body via the door hinge attached to the hinge pillar. Herein, since the first joint portions are arranged at the position which overlaps the door hinge to attach the door body at the vehicle body in the vehicle vertical direction according to the above-described embodiment, the vehicle head-on collision load can be transmitted to the impact bar effectively. Further, in the vehicle side collision, the vehicle-side collision load received at the impact bar can be transmitted to the hinge pillar effectively via the first joint portions, the door inner panel, and the door hinge.

Other features, aspects, and advantages of the present invention will become apparent from the following description which refers to the accompanying drawings.

DETAILED DESCRIPTION OF THE INVENTION

Figure 1:
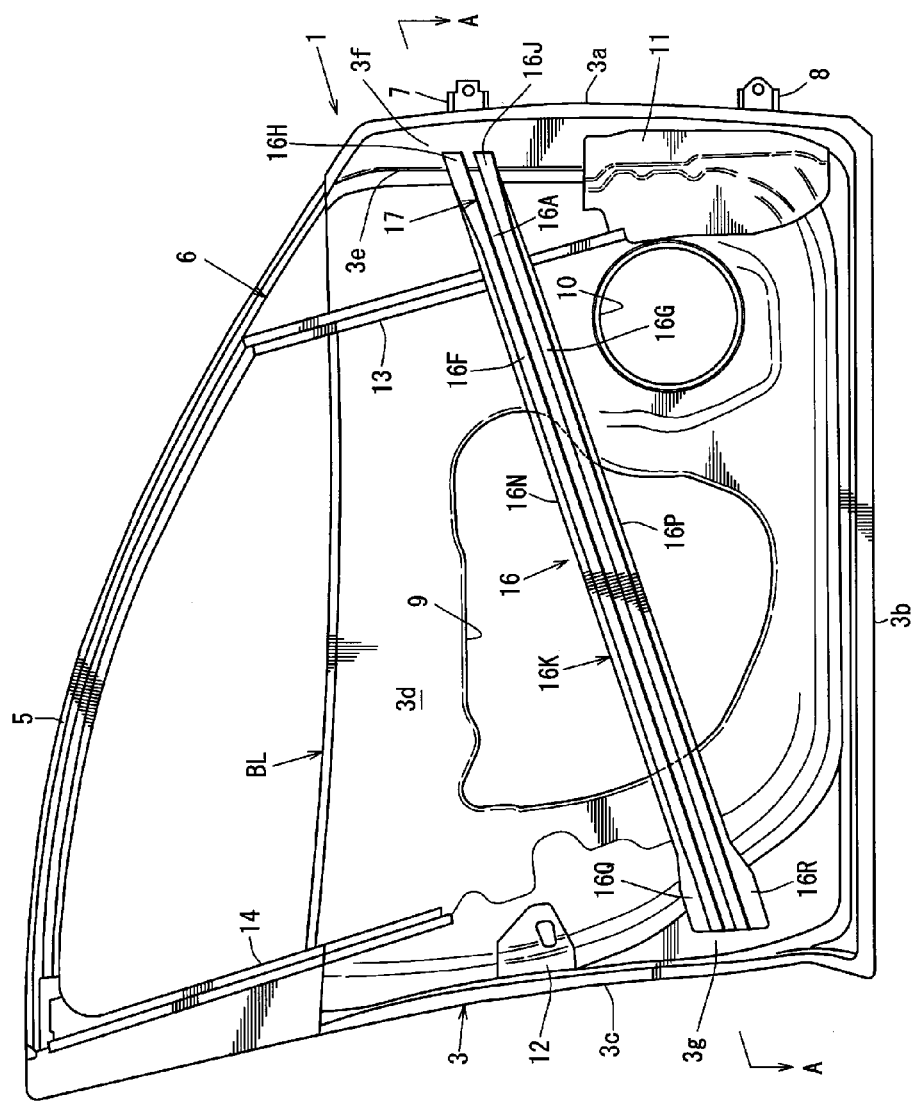
FIG. 1 is a side view showing a door structure of a vehicle of the present invention.
Figure 2:
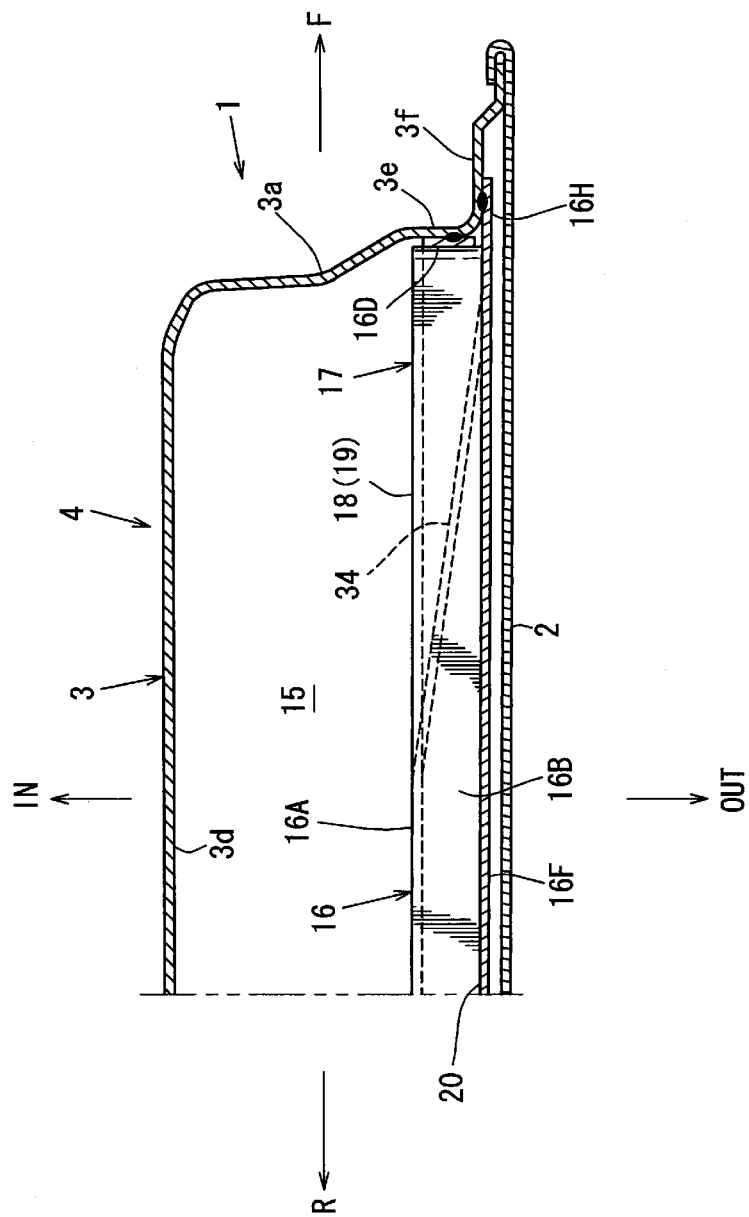
FIG. 2 is a major-part sectional view taken along line A-A of FIG. 1.

Hereinafter, an embodiment of the present invention will be described specifically referring to the drawings. FIG. 1 is a side view showing a door inside structure, removing a door outer panel, and FIG. 2 is a major-part sectional view taken along line A-A of FIG. 1. Herein, in the figures, an arrow F shows a vehicle-front direction, an arrow R shows a vehicle-rear direction, an arrow IN shows a vehicle-inward direction, and an arrow OUT shows a vehicle-outward side.

In FIGS. 1 and 2, a front side door 1 which is provided to open or close a door opening portion formed beside a driver's seat or an assistant's seat for passenger's ingress/egress includes a door outer panel 2 and a door inner panel 3. As shown in FIG. 1, a door body 4 (see FIG. 2) which is formed by the door outer panel 2 and the door inner panel 3 joined together has a door sash portion 5 at its upper portion, and a door outer handle (not illustrated) is provided at a specified position of the door outer panel 2. Further, as shown in FIG. 1, a triangular corner portion 6 which is enclosed by a beltline portion BL and the door sash portion 5 is provided at a front end portion of a side-window (door-glass) arrangement portion of the door 1.

The door inner panel 3 is, as shown in FIG. 1, formed integrally, through pressing, by a front side portion 3a, a lower side portion 3b, a rear side portion 3c, and a vertical wall portion 3d enclosed by the respective side portions 3a, 3b, 3c and the beltline portion BL. Door hinge brackets 7, 8 are attached to upper and lower positions of a front face of the front side portion 3a, respectively. The upper-and-lower door hinge brackets 7, 8 are door hinges to support the front side door 1 including the door body 4 at a hinge pillar (not illustrated) as a vehicle body for opening or closing. Further, at the above-described vertical wall portion 3d are formed an opening portion 9 for arranging a door module and an opening portion 10 for arranging a sound speaker positioned in front of the opening portion 9.

Also, as shown in FIG. 1, a lower hinge reinforcement 11 is provided between the front side portion 3a and the vertical wall portion 3b of the door inner panel 3 at a specified position corresponding to the lower door hinge bracket 8.

Moreover, as shown in FIG. 1, a latch reinforcement 12 is fixed to a middle portion, in the vehicle vertical direction, of the rear side portion 3c of the door inner panel 3, so that an attachment portion of a door latch, not illustrated, is reinforced by the latch reinforcement 12.

Further, as shown in FIG. 1, a pair of front-and-rear glass guides 13, 14 (glass run channels) which vertically guide front and rear end portions of the side window are attached at the door inner panel 3, so that the side window can slide along the pair of front-and-rear glass guides 13, 14. An impact bar 16 which is configured to extend in the vehicle longitudinal direction and be attached to the front side portion 3a and the rear side portion 3c of the door inner panel 3 is provided in an inner space 15 (see FIG. 2) of the door body 4 which is formed by the door inner panel 3 and the door outer panel 4. As shown in FIG. 1, the impact bar 16 is attached between an upper portion of the front side portion 3a of the door inner panel 3 and a lower portion of the rear side portion 3c of the door inner panel 3 such that it slants with its front being located at a higher level than its rear.

Figure 3:
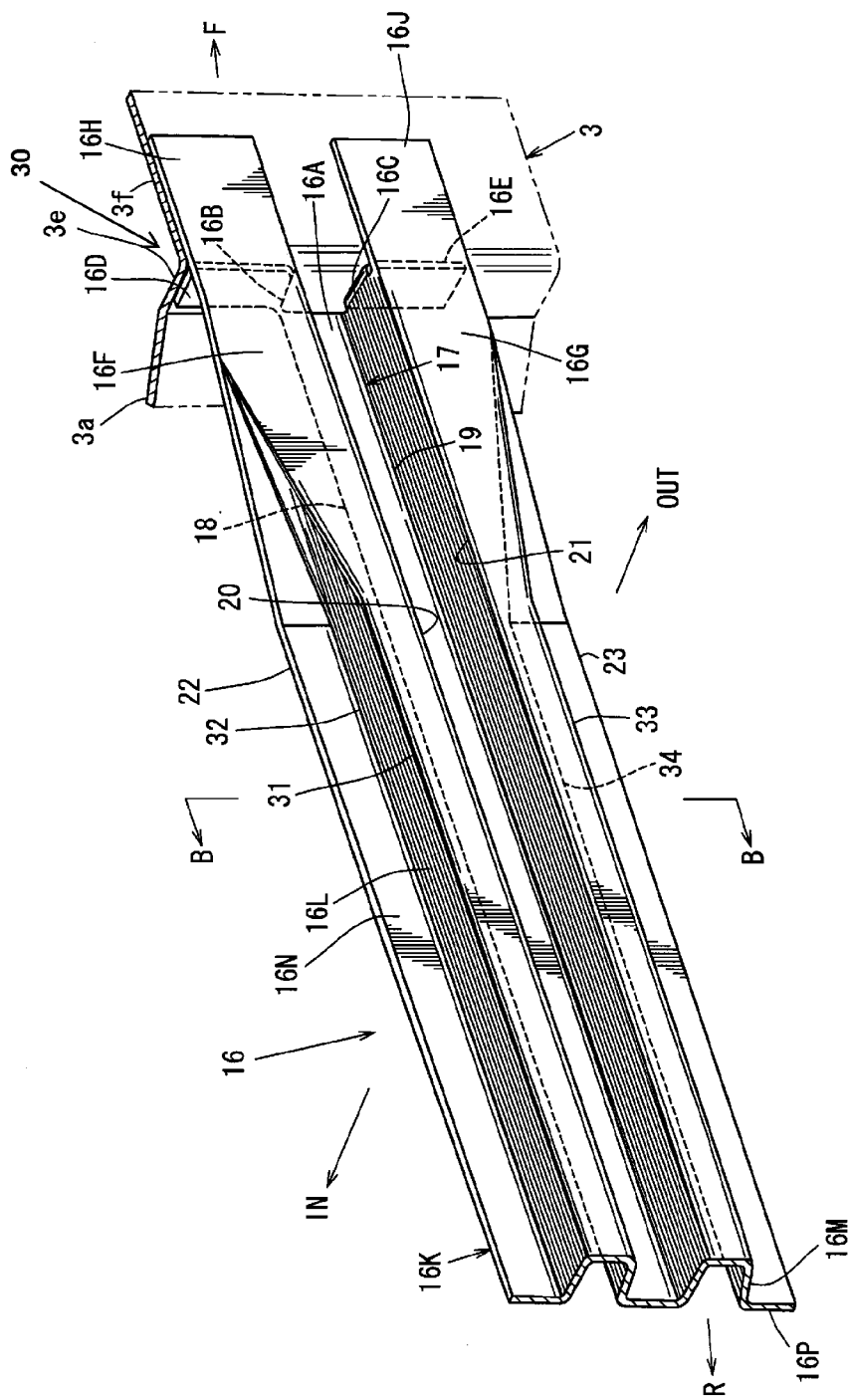
FIG. 3 is a major-part perspective view of FIG. 1.
Figure 4A:
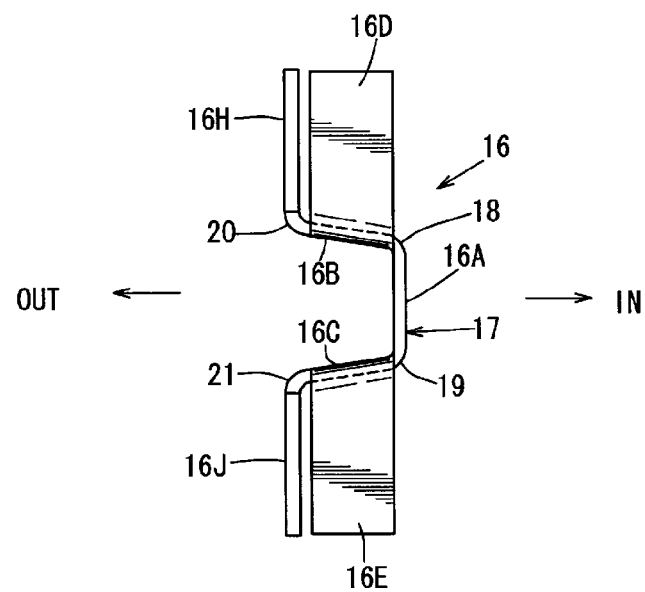
FIG. 4A is an elevational view showing a shape of a front end portion of an impact bar.
Figure 4B:
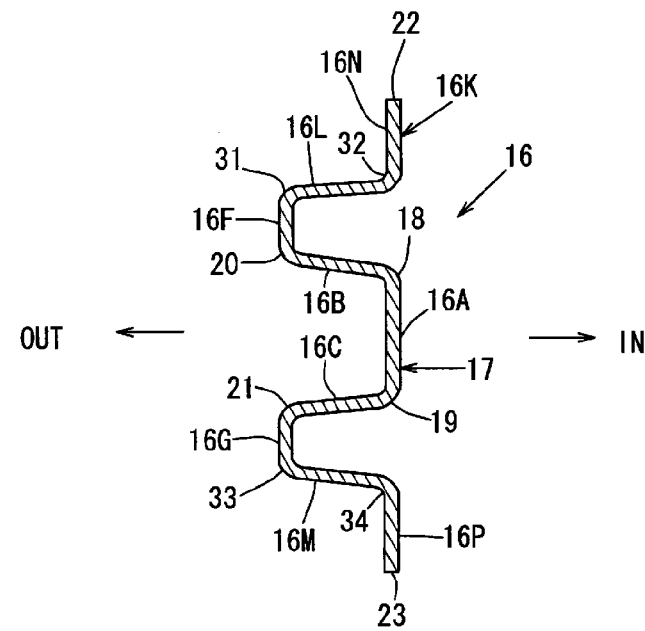
FIG. 4B is a sectional view taken along line B-B of FIG. 3.

FIG. 3 is a major-part enlarged perspective view of the impact bar, and FIG. 4A is an elevational view showing a shape of a front end portion of the impact bar, and FIG. 4B is a sectional view showing a shape of the body portion of the impact bar, taken along line B-B of FIG. 3. As shown in FIGS. 3 and 4, a front end of the impact bar constitutes a U-shaped portion 17 which is formed in substantially a U shape by a vertical face portion 16A extending substantially in the vehicle vertical direction and upper-and-lower lateral face portions 16B, 16C extending respectively outward in the vehicle width direction from upper and lower ends of the vertical face portion 16A. Further, there are provided a pair of first joint portions 16D, 16E which are bent so as to extend upward and downward from respective front ends of the upper-and-lower lateral face portions 16B, 16C. Also, there are provided upper-and-lower outer face portions 16F, 16G which are bent so as to extend upward and downward from respective outward ends of the upper-and-lower lateral face portions 16B, 16C. Moreover, there are provided a pair of second joint portions 16H, 16J which are formed so as to extend forward from respective front ends of the upper-and-lower outer face portions 16F, 16G.

A body portion 16K of the impact bar 16, which excludes front-and-rear both end portions of the impact bar 16 to be attached to the door inner panel 3, comprises the above-described U-shaped portion 17, the above-described upper-and-lower outer face portions 16F, 16G, upper and lower face portions 16L, 16M which are configured to extend respectively inward in the vehicle width direction from upper and lower ends of the upper-and-lower outer face portions 16F, 16G, and upper-and-lower inner face portions 16N, 16P which are configured to extend upward and downward from respective inward ends of the upper and lower face portions 16L, 16M, whereby the body portion 16K of the impact bar 16 has substantially a W-shaped cross section as shown in FIG. 4B.

Considering press forming of the impact bar 16, especially for the easy removability from a press mold, the impact bar 87 is configured as shown in FIG. 4B such that the upper face portion 16L and the lower lateral face portion 16C slant, respectively, with their inward potions being located at a higher level than their outward portions. Further, the U-shaped portion 17 is configured continuously over an entire length of the impact bar 16, i.e., from a front end to a rear end of the impact bar 16. Four ridgelines 18, 19, 20, 21 are formed at four corner portions of the U-shaped portion 17, respectively.

Further, the body portion 16K of the impact bar 16 includes a first ridgeline 31 formed between the upper face portion 16L and the upper outer face portion 16F, a second ridgeline 32 formed between the upper face portion 16L and the upper inner face portion 16N, and an upper end line 22 (a so-called edge line) formed at an upper end of the upper inner face portion 16N. Likewise, the body portion 16K of the impact bar 16 further includes a third ridgeline 33 formed between the lower face portion 16M and the lower outer face portion 16G, a fourth ridgeline 34 formed between the lower face portion 16M and the lower inner face portion 16P, and a lower end line 23 (a so-called edge line) formed at a lower end of the lower inner face portion 16P.

As shown in FIGS. 2 and 3, the first joint portions 16D, 16E formed at the front end of impact bar 16 are jointly fixed by spot welding to a lateral face portion 3e (specifically, a portion provided in parallel to a face extending in the vehicle width-and-vertical directions) which partially forms a corner portion 30 at the front side portion 3a of the door inner panel 3. Further, the second joint portions 16H, 16J formed at the front end of impact bar 16 are jointly fixed by spot welding to a longitudinal face portion 3f (specifically, a portion provided in parallel to a face extending in the vehicle longitudinal-and-vertical directions) which partially forms the corner portion 30 at the front side portion 3a of the door inner panel 3.

As shown in FIGS. 1 and 2, the first joint portions 16D, 16E and the second joint portions 16H, 16J are arranged at positions which overlap the upper door hinge bracket 7 to attach the front side door 1 to the hinge pillar as the vehicle body in the vehicle vertical direction.

As shown in FIG. 1, at an end portion of the impact bar 16 are provided a pair of joint flange portions 16Q, 16R which are integrally formed with the above-described upper-and-low inner face portions 16N, 16P and have a vertical width wider than that of the inner face portions 16N, 16P. The pair of joint flange portions 16Q, 16R are jointly fixed by spot welding to a longitudinal face portion 3g (specifically, a portion provided in parallel to a face extending in the vehicle longitudinal-and-vertical directions) of a lower portion of the rear side portion 3c of the door inner panel 3. Further, as shown in FIG. 3, in the present embodiment, the first ridgeline 31 and the second ridgeline 32, and the upper end line 22 converge at a point near an upper-side rear end of the second joint portion 16H, and the third ridgeline 33, the fourth ridgeline 34, and the lower end line 23 converge at a point near a lower-side rear end of the second joint portion 16J.

By positioning the convergent point of the above-described elements 31, 32, 22 near the upper-side rear end of the second joint portion 16H and also positioning the convergent point of the above-described elements 33, 34, 23 near the lower-side rear end of the second joint portion 16J, the vertical width of the second joint portions 16H, 16J is made wider than that of the outer face portions 16F, 16G of the impact bar body portion 16K, so that the joint strength can be improved. Also, it is configured such that the vertical width of the body portion 16K of the impact bar 16 is substantially equal to a vertical distance between an upper end of the upper second joint potion 16H and a lower end of the lower second joint portion 16J as well as a vertical distance between an upper end of the upper first joint potion 16D and a lower end of the lower first joint portion 16E.

As described above, the present door structure of a vehicle comprises the door body 4 including the door inner panel 3 and the door outer panel 2, and the impact bar 16 provided in the inner space 15 of the door body 4 and extending in the vehicle longitudinal direction, the impact bar 16 being joined to the door inner panel 3 of the door body 4, wherein the door inner panel 3 of the door body 4 includes the corner portion 30 at its front end, which is formed by the lateral face portion 3e extending substantially in the vehicle width direction and the longitudinal face portion 3f extending substantially in the vehicle longitudinal direction, the impact bar 16 includes the U-shaped portion 17 at its front end, the U-shaped portion 17 being formed in substantially the U shape by the vertical face portion 16A extending substantially in the vehicle vertical direction and the upper-and-lower lateral face portions 16B, 16C extending respectively outward in the vehicle width direction from the upper and lower ends of the vertical face portion 16A, the impact bar 16 further including the upper-and-lower outer face portions 16F, 16G which are configured to extend upward and downward from the respective outward ends of the upper-and-lower lateral face portions 16B, 16C, and the joining of the impact bar 16 to the door inner panel 3 of the door body 4 is configured such that the pair of first joint portions 16D, 16E which are formed so as to extend upward and downward from the respective front ends of the upper-and-lower lateral face portions 16B, 16C of the impact bar 16 are joined to the lateral face portion 3e of the corner portion 30 of the door inner panel 3, respectively, whereas the pair of second joint portions 16H, 16J which are formed so as to extend forward from the respective front ends of the upper-and-lower outer face portions 16F, 16G of the impact bar 16 are joined to the longitudinal face portion 3f of the corner portion 30 of the door inner panel 3, respectively.

Figure 6:
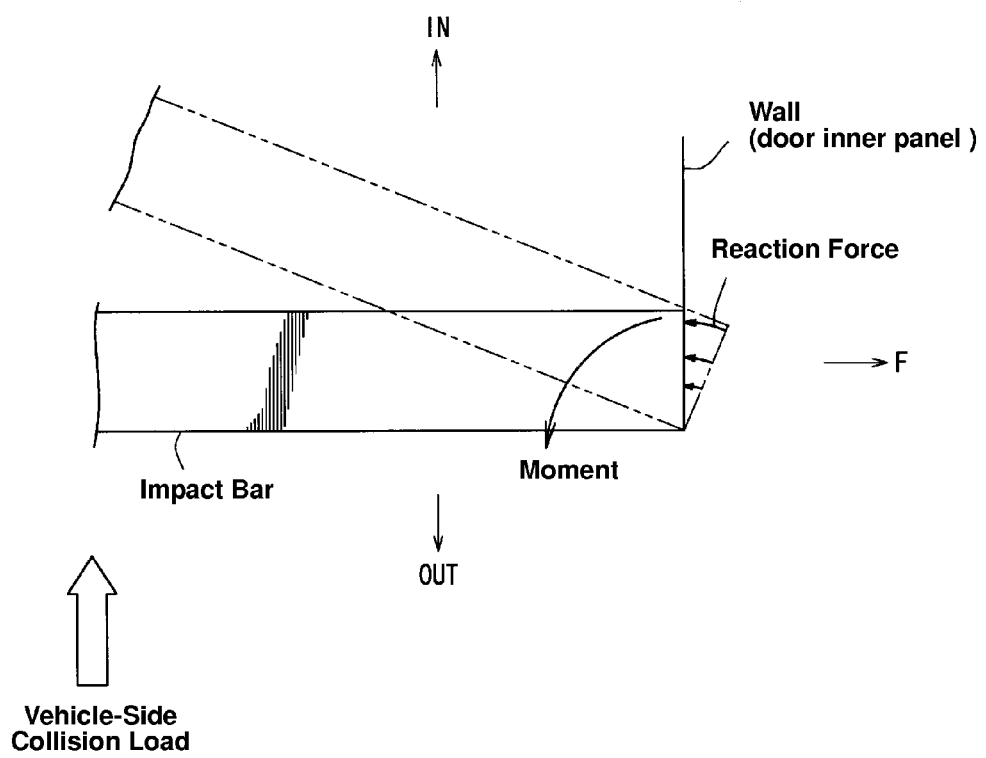
FIG. 6 is an operational explanatory diagram in a vehicle side collision.
Figure 7:
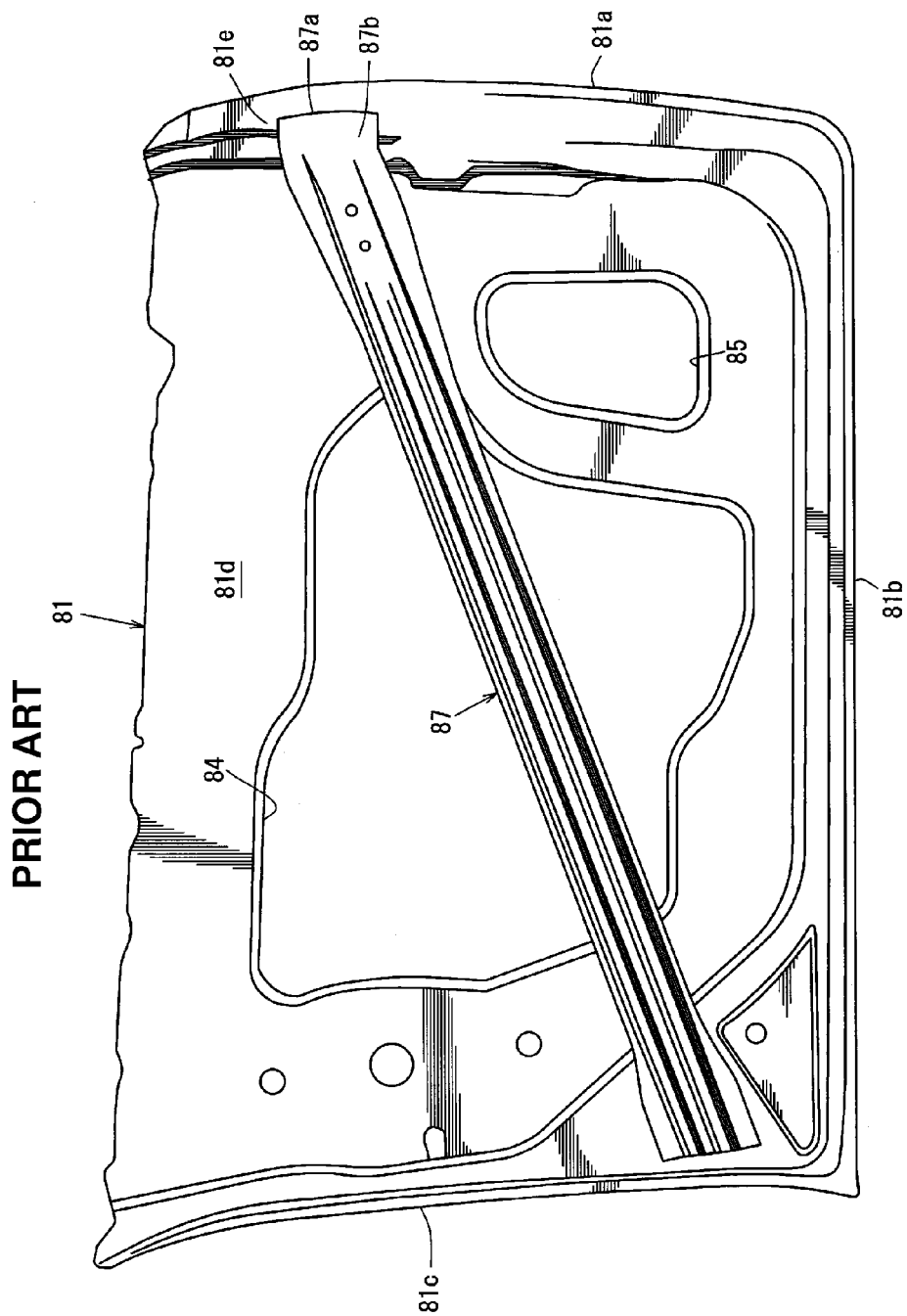
FIG. 7 is a side view showing a conventional door structure of a vehicle.
Figure 8:
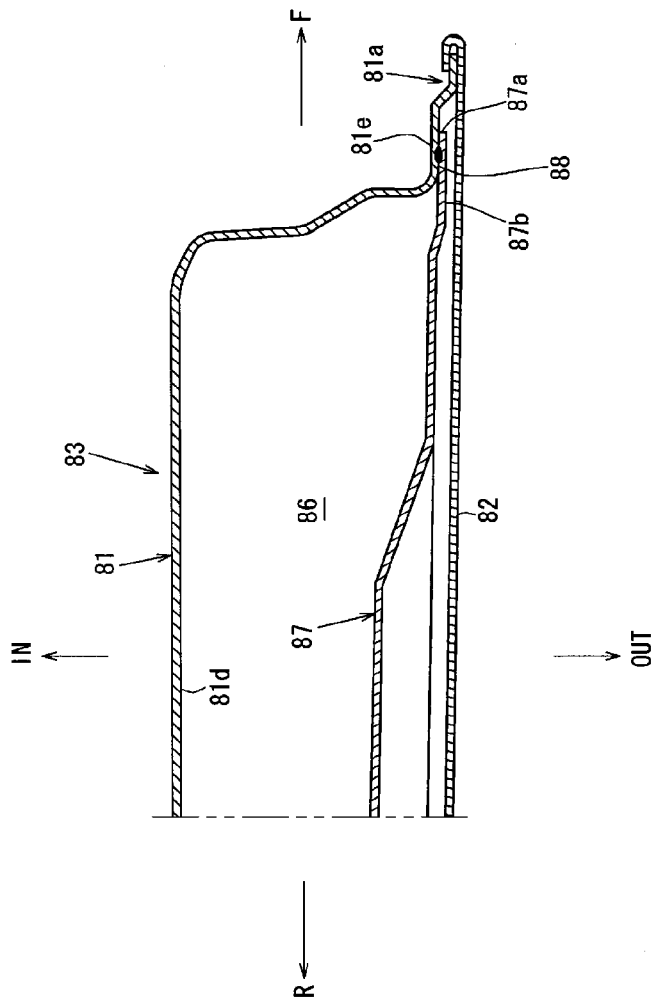
FIG. 8 is a major-part enlarged sectional view of FIG. 7.

According to the present door structure of a vehicle, since the amount of contact of the impact bar 16 with the door inner panel 3 can be properly large by means of the first joint portions 16D, 16E, the vehicle-head-on collision load can be received surely. Further, since the U-shaped portion 17 contacts the lateral face portion 3e of the door inner panel 3, the vehicle-head-on collision load can be transmitted rearward more effectively by the four ridgelines 18, 19, 20, 21 of the impact bar 16 which extend rearward from the U-shaped portion 17. In the vehicle side collision, meanwhile, as shown in FIGS. 3 and 6, while the vehicle-side collision load received by the second joint portions 16H, 16J is inputted to the door inner panel 3 via the first joint portions 16D, 16E and the U-shaped portion 17, the amount of contact of the front end of the impact bar 16 with the door inner panel 3 is so large that a large reaction force from the door inner panel 3 to the impact bar 16 can occur and also a moment around front portions of outward ends, in the vehicle width direction, of the U-shaped portion 17, with a moment arm of the length in the vehicle width direction of the U-shaped portion 17 (a moment acting in a specified direction which can cancel a moment caused by the vehicle-side collision load) can occur properly. Accordingly, the resistant load of the impact bar 16 can be properly large, so that the impact bar 16 can be restrained from deforming, and thus the large vehicle-side collision load can be received properly.

Moreover, the first joint portions 16D, 16E and the second joint portions 16H, 16J can be arranged within the vertical width of the impact bar 16, so that even if the impact bar 16 is configured to have the relatively-small vertical width, the impact bar 16 can be joined to the door inner panel 3 properly. Accordingly, the layout flexibility of the impact bar 16 can be improved. Consequently, the vehicle-head-on collision load can be effectively transmitted rearward, and also the resistance against the vehicle side collision can be improved. Thus, the door structure according to the present embodiment can cope with both the vehicle head-on collision and the vehicle side collision even with the single impact bar 16.

Also, the body portion 16K of the impact bar 16 comprises the U-shaped portion 17, the upper-and-lower outer face portions 16F, 16G, the upper and lower face portions 16F, 16G being configured to extend respectively inward in the vehicle width direction from the upper and lower ends of the upper-and-lower outer face portions 16F, 16G, and the upper-and-lower inner face portions 16N, 16P being configured to extend upward and downward from the respective inward ends of the upper and lower face portions 16L, 16M, whereby the body portion 16K of the impact bar 16 has substantially the W-shaped cross section (see FIG. 4).

Thereby, a central portion, in the vehicle vertical direction, of the W-shaped body portion 17 of the impact bar 16 can be formed by extending the four ridgelines 18, 19, 20, 21 of the U-shaped portion 17, and also the rigidity and strength of the impact bar 16 itself can be improved.

Further, the first ridgeline 31 formed between the upper face portion 16L and the upper outer face portion 16F, the second ridgeline 32 formed between the upper face portion 16L and the upper inner face portion 16N, and the upper end line 22 formed at the upper end of the upper inner face portion 16N converge at the point near the rear end of the second joint portion 16H, and the third ridgeline 33 formed between the lower face portion 16M and the lower outer face portion 16G, the fourth ridgeline 34 formed between the lower face portion 16M and the lower inner face portion 16P, and the lower end line 23 formed at the lower end of the lower inner face portion 16P converge at the point near the rear end of the second joint portion 16J.

Thereby, since the first ridgeline 31, the second ridgeline 32, and the upper end line 22 converge at the point near the rear end of the second joint portion 16H, and the third ridgeline 33, the fourth ridgeline 34, and the lower end line 23 converge at the point near the rear end of the second joint portion 16J, the appropriate forming of the impact bar 16 can be ensured.

Additionally, the first joint portions 16D, 16E of the impact bar 16 are arranged at the position which overlaps the door hinge (see the door hinge bracket 7) to attach the door body 4 to the vehicle body (see the hinge pillar) in the vehicle vertical direction (see FIGS. 1-3).

This constitution can provide the following effect. That is, in the vehicle head-on collision, the vehicle-head-on collision load is inputted to the hinge pillar from an apron reinforcement and then inputted to the door body 4 via the door hinge bracket 7 attached to the hinge pillar. Herein, since the first joint portions 16D, 16E of the impact bar 16 are arranged at the position which overlaps the door hinge bracket 7 in the vehicle vertical direction according to the present embodiment, the vehicle head-on collision can be transmitted to the impact bar 16 effectively. Further, in the vehicle side collision, the vehicle-side collision load received at the impact bar 16 can be transmitted to the hinge pillar effectively via the first joint portions 16D, 16E, the door inner panel 3, and the door hinge bracket 7.

Figure 5:
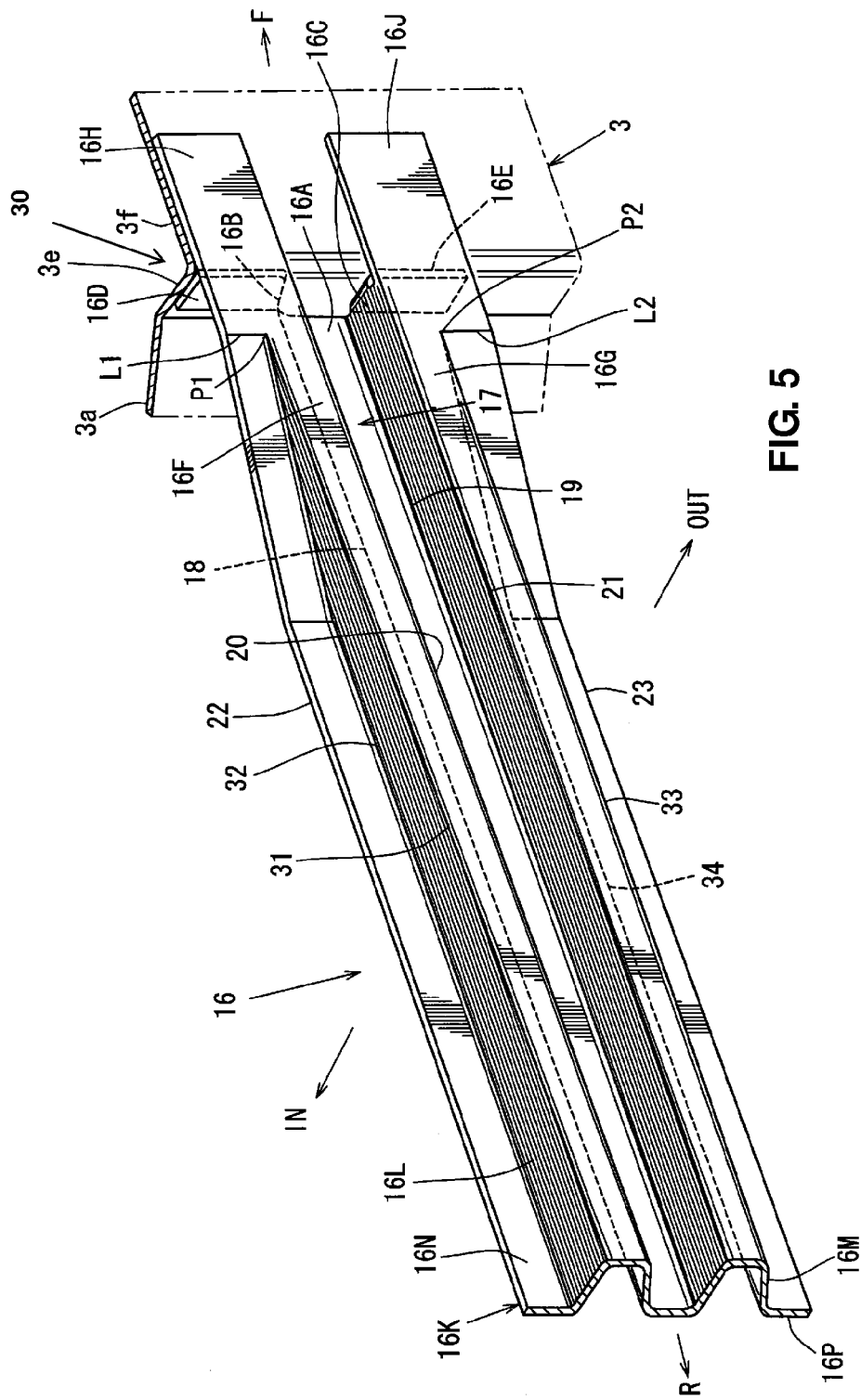
FIG. 5 is a major-part perspective view showing another embodiment of the door structure of a vehicle.

FIG. 5 is a major-part perspective view showing another embodiment of the door structure of a vehicle. The above-described embodiment shown in FIG. 3 is configured such that the respective elements 22, 31, 32 converge at the point near the upper-side rear end of the second joint portion 16H and also the respective elements 23, 33, 34 converge at the point near the lower-side rear end of the second joint portion 16J. Meanwhile, this embodiment shown in FIG. 5 is configured such that the first ridgeline 31 and the second ridgeline 32 converge at a point, i.e., a convergent point P1, which is located on an extensional line of the first ridgeline 31 and near the rear end of the upper second joint portion 16H, and a bending line L1 which extends upward from the convergent point P1 is continuous to the upper inner face portion 16N, and also the third ridgeline 33 and the fourth ridgeline 34 converge at a point, i.e., a convergent point P2, which is located on an extensional line of the third ridgeline 33 and near the rear end of the lower second joint portion 16J, and a bending line L2 which extends downward from the convergent point P2 is continuous to the lower inner face portion 16P.

The present embodiment is also configured such that the vertical width of the second joint portions 16H, 16J is wider than that of the outer face portions 16F, 16G of the impact bar body portion 16K so as to improve the joint strength.

In the present embodiment shown in FIG. 5, the first ridgeline 31 formed between the upper face portion 16L and the upper outer face portion 16F and the second ridgeline 32 formed between the upper face 16L and the upper inner face portion 16N converge at a point near the rear end of the second joint portion 16H, and the third ridgeline 33 formed between the lower face portion 16M and the lower outer face portion 16G and the fourth ridgeline 34 formed between the lower face portion 16M and the lower inner face portion 16P converge at a point near the rear end of the second joint portion 16J (see FIG. 5).

Thereby, since the first ridgeline 31 and the second ridgeline 32 converge at the point near the rear end of the second joint portion 16H, and the third ridgeline 33 and the fourth ridgeline 34 converge at the point near the rear end of the second joint portion 16J, the appropriate forming of the impact bar 16 can be ensured. Further, the stress which may be generated in the vehicle head-on collision or the vehicle side collision can be dispersed at two points of rear ends of the second joint portions 16H, 16J (or joint positions of the first joint portions 16D, 16E) as well as front portions (see the bending lines L1, L2) of the upper-and-lower inner face portions 16N, 16P which correspond to the above-described converging points.

The present embodiment shown in FIG. 5 has the same other structures and thereby provides the same operations and effects as the previous embodiment shown in FIG. 3 does. Therefore, in FIG. 5 the same reference characters are used for the same structures shown in FIG. 3, descriptions of which are omitted here.

The door of the present invention corresponds to the front side door 1 of the above-described embodiments. Likewise, the door hinge of the present invention corresponds to the door hinge bracket 7 of the above-described embodiments. However, the present invention should not be limited to the above-described embodiments, and any other modifications or improvements may be applied within the scope of the claimed invention.

What is claimed is:

1. A door structure of a vehicle, comprising:
   a door body including a door inner panel and a door outer panel; and
   an impact bar provided in an inner space of the door body and extending in a vehicle longitudinal direction, the impact bar being joined to the door inner panel of the door body, wherein the door inner panel of said door body includes a corner portion at a front end thereof, which is formed by a lateral face portion extending substantially in a vehicle width direction and a longitudinal face portion extending substantially in the vehicle longitudinal direction,
   said impact bar includes a U-shaped portion at a front end thereof, the U-shaped portion being formed in substantially a U shape by a vertical face portion extending substantially in a vehicle vertical direction and upper-and-lower lateral face portions extending respectively outward in the vehicle width direction from upper and lower ends of the vertical face portion, the impact bar further including upper-and-lower outer face portions which are configured to extend upward and downward from respective outward ends of the upper-and-lower lateral face portions, and
   said joining of the impact bar to the door inner panel of the door body is configured such that a pair of first joint portions which are formed so as to extend upward and downward from respective front ends of said upper-and-lower lateral face portions of the impact bar are joined to said lateral face portion of the corner portion of the door inner panel, respectively, whereas a pair of second joint portions which are formed so as to extend forward from respective front ends of said upper-and-lower outer face portions of the impact bar are joined to said longitudinal face portion of the corner portion of the door inner panel, respectively.

2. The door structure of a vehicle of claim 1, wherein a body portion of said impact bar comprises said U-shaped portion, said upper-and-lower outer face portions, upper and lower face portions being configured to extend respectively inward in the vehicle width direction from upper and lower ends of the upper-and-lower outer face portions, and upper-and-lower inner face portions being configured to extend upward and downward from respective inward ends of the upper and lower face portions, whereby the body portion of the impact bar has substantially a W-shaped cross section.

3. The door structure of a vehicle of claim 2, wherein a first ridgeline formed between said upper face portion and said upper outer face portion, a second ridgeline formed between the upper face portion and said upper inner face portion, and an upper end line formed at an upper end of the upper inner face portion converge at a point near a rear end of one of said second joint portions, and a third ridgeline formed between said lower face portion and said lower outer face portion, a fourth ridgeline formed between the lower face portion and said lower inner face portion, and a lower end line formed at a lower end of the lower inner face portion converge at a point near a rear end of the other of said second joint portions.

4. The door structure of a vehicle of claim 2, wherein a first ridgeline formed between said upper face portion and said upper outer face portion and a second ridgeline formed between the upper face portion and said upper inner face portion converge at a point near a rear end of one of said second joint portions, and a third ridgeline formed between said lower face portion and said lower outer face portion and a fourth ridgeline formed between the lower face portion and said lower inner face portion converge at a point near a rear end of the other of said second joint portions.

5. The door structure of a vehicle of claim 1, wherein said first joint portions are arranged at a position which overlaps a door hinge to attach the door body to a vehicle body in the vehicle vertical direction.

6. The door structure of a vehicle of claim 2, wherein said first joint portions are arranged at a position which overlaps a door hinge to attach the door body to a vehicle body in the vehicle vertical direction.

7. The door structure of a vehicle of claim 3, wherein said first joint portions are arranged at a position which overlaps a door hinge to attach the door body to a vehicle body in the vehicle vertical direction.

8. The door structure of a vehicle of claim 4, wherein said first joint portions are arranged at a position which overlaps a door hinge to attach the door body to a vehicle body in the vehicle vertical direction.

9. The door structure of a vehicle of claim 1, wherein said impact bar is attached between an upper portion of a front side portion of said door inner panel and a lower portion of a rear side portion of said door inner panel such that the impact bar slants with the front end thereof being located at a higher level than a rear end thereof.

10. The door structure of a vehicle of claim 2, wherein a vertical width of said second joint portions is configured to be wider than that of said outer face portions of the body portion of the impact bar.

11. The door structure of a vehicle of claim 2, wherein a vertical width of said body portion of the impact bar is configured to be substantially equal to a vertical distance between an upper end of an upper-side one of said second joint potions and a lower end of a lower-side one of said second joint portions and also equal to a vertical distance between an upper end of an upper-side one of said first joint potions and a lower end of a lower-side one of said first joint portions.

12. The door structure of a vehicle of claim 2, wherein said impact bar includes a pair of joint flange portions at a rear end thereof, the pair of joint flange portions being configured to be integrally formed with said upper-and-low inner face portions and have a vertical width wider than that of the upper-and-low inner face portions, respectively, the pair of joint flange portions being fixed to a longitudinal face portion substantially extending in the vehicle longitudinal direction of a rear side portion of said door inner panel.

\* \* \* \* \*